US012608127B2

(12) United States Patent
Sedouram et al.

(10) Patent No.: US 12,608,127 B2
(45) Date of Patent: Apr. 21, 2026

(54) FACILITATING MODEL OUTPUT MODIFICATIONS VIA PHYSICAL GESTURE DIRECTED TO PORTION OF GENERATIVE OUTPUT

(71) Applicant: GOOGLE LLC, Mountain View, CA (US)

(72) Inventors: Ramprasad Sedouram, Bangalore (IN); Siyan Khader Sameema, Bangalore (IN); Ajay Prasad, Bangalore (IN); Karthik Srinivas, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/781,611

(22) Filed: Jul. 23, 2024

(65) Prior Publication Data

US 2026/0029910 A1      Jan. 29, 2026

(51) Int. Cl.
G06F 3/04883          (2022.01)
G06F 3/14          (2006.01)
(Continued)

(52) U.S. Cl.
CPC ............ G06F 3/04883 (2013.01); G06F 3/14 (2013.01); G06T 11/203 (2013.01); G06T 11/60 (2013.01); G06V 40/174 (2022.01); G06V 40/28 (2022.01)

(58) Field of Classification Search
CPC .... G06F 3/04883; G06F 3/14; G06F 16/5846; G06F 3/0486; G06F 3/04845;
(Continued)

(56) References Cited

U.S. PATENT DOCUMENTS

2009/0018867 A1    1/2009  Reiner
2022/0075933 A1*   3/2022  Jon ...................... G06F 3/0486
(Continued)

OTHER PUBLICATIONS

Alashhab et al., "Engineering Applications of Artificial Intelligence" Elsevier. DOI: https://doi.org/10.1016/j.engappai.2022. 105188. 21 pages, dated 2022.
(Continued)

*Primary Examiner* — Richard J Hong
(74) *Attorney, Agent, or Firm* — Gray Ice Higdon

(57)          ABSTRACT

Implementations set forth herein relate to modifying a generative output of an application according to an input gesture that is performed without necessarily interacting with a GUI element that is rendered separate from a generative output (e.g., a GUI element separate from a natural language output generated using an LLM or an image generated using an image diffusion model). Various different input gestures can be performed by a user to refine a generative output to be simpler, more complex, to include an image, to modify a generated image, and/or otherwise modify the generative output. In some implementations, an input gesture can be processed as one or more predetermined gestures, and/or an input gesture can be interpreted per case using an available model for interpreting such gestures. In this way, models for interpreting gestures and/or refining generative output can be enhanced through further training of such models.

21 Claims, 9 Drawing Sheets

(51) Int. Cl.

| | |
|---|---|
| *G06T 11/20* | (2006.01) |
| *G06T 11/60* | (2006.01) |
| *G06V 40/16* | (2022.01) |
| *G06V 40/20* | (2022.01) |

(58) Field of Classification Search
CPC .... G06F 40/295; G06V 40/174; G06V 40/28;
G06V 10/82; G06T 11/203; G06T 11/60;
G11B 27/031; G06Q 30/0271
See application file for complete search history.

(56) References Cited

U.S. PATENT DOCUMENTS

| | | | |
|---|---|---|---|
| 2022/0179670 | A1 | 6/2022 | Liu et al. |
| 2022/0300550 | A1* | 9/2022 | Bjornsson ........... G06F 16/5846 |
| 2024/0386207 | A1* | 11/2024 | Emrey ................. G06F 40/295 |
| 2025/0014606 | A1* | 1/2025 | Wong ................... G11B 27/031 |
| 2025/0061491 | A1* | 2/2025 | Ahmad-Taylor ............................ |
| | | | G06Q 30/0271 |
| 2025/0104243 | A1* | 3/2025 | Deutsch ................. G06V 10/82 |
| 2025/0111335 | A1* | 4/2025 | Wilson ............... G06F 3/04845 |

OTHER PUBLICATIONS

Bridget Johnston "Zoom Out AI Makes Marketing and Design Easier than Ever" Shutterstock. Retreived from https://www.shutterstock.com/blog/author/bridget-johnston. 10 pages, dated 2023.

* cited by examiner

300

COMPUTING DEVICE
302

USER INTERFACE
320

APPLICATIONS
334

APPLICATION
DATA
330

MODEL DATA
332

CONTEXTUAL
DATA
336

APPLIATION / AUTOMATED ASSISTANT
304

INPUT PROCESSING ENGINE
306

SPEECH PROCESSING ENGINE
308

DATA PARSING ENGINE
310

PARAMETER ENGINE
312

TRAINING DATA
338

OUTPUT SELECTION ENGINE
316

GESTURE PROCESSING ENGINE
318

MODEL SELECTION ENGINE
326

OUTPUT GENERATING ENGINE
314

MODIFIED OUTPUT ENGINE
324

MODEL INPUT ENGINE
322

FIG. 3

FACILITATING MODEL OUTPUT MODIFICATIONS VIA PHYSICAL GESTURE DIRECTED TO PORTION OF GENERATIVE OUTPUT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, assistant applications, and/or other applications that can provide generative outputs that leverage trained generative models, such as large language models (LLMs), large vision language models (VLMs), and/or other trained generative models. In such instances, a generative output can be provided in response to an input query from a user that is, for example, seeking to receive an explanation of a concept, a draft snippet of computer code, and/or a quick illustration of an original idea.

However, when a user considers initially generated generative output to be less than adequate, the user is limited in how the generative output can be modified to fulfill an original intent of the user. For example, an input interface of an application that renders the initial generative output can limit any refining inputs to a subsequent input query to an input field in which the initial input query was provided. In such instances, for a user to receive a more detailed output, the application may re-generate all of the initial generative output with some additional details that are responsive to the subsequent input query. This regenerating of an entirety of the initial generative output can be redundant, and thus waste computational resources at any local and/or remote applications or devices that are tasked with employing one or more models for generating the generative output. Moreover, the regenerating of the entirety of the initial generative output can result in refined output that is substantially different from the initial generative output—resulting in a need of the user to provide a further input query.

For example, a remote database and/or server farm tasked with processing input queries for a generative AI model would be repeatedly generating much of the same content, thereby unnecessarily consuming power and processing bandwidth. Similarly, any local application would be repeatedly rendering this same content, further wasting power and computational resources with respect to any client computing device executing the local application. Hence, there is a desire in this field of art for means to enhance or refine an initial generative output according to particular follow-up inputs that are not broadly applied to an entirety of an initial generative output. Furthermore, there is a desire in this field of art to broaden requests to refine generative outputs to beyond standard GUI elements, which may require multiple tedious user interactions with the GUI elements and which may be constrained to only a small number of fixed refinement options only affect an entirety of an initial generative output and a single model parameter (e.g., generative model temperature).

SUMMARY

Implementations are described herein for processing input gestures to facilitate modification of a generative output that is generated using one or more generative models. For example, an initial generative output can be rendered at a touchscreen and can be the result of processing a user query using one or more trained machine learning models such as, but not limited to, a large language model (LLM), a vision language model (VLM), and/or other generative model(s). Continuing with the example, a user can provide a pinch to zoom-in gesture at the touchscreen and atop at least a portion of the rendered initial generative output. In response to the pinch to zoom-in gesture being directed to (e.g., atop at least a portion of) the rendered generative output, refined generative output can be generated that is based on the pinch to zoom-in gesture and the initial generative output—and the refined generative output rendered responsive to the pinch to zoom-in gesture (e.g., the refined generative output can supplant the initial generative output). For example, the pinch to zoom-in gesture can be mapped to a shorten refinement and the refined generative output can be a shortened (e.g., lesser quantity of words) version of the initial generative output. For instance, it can be generated based on processing, using a generative model, a prompt that includes the initial generative output and instructions to generate a shortened version thereof. As a particular instance, the prompt can be of the form "shorten the following by about X %: [initial generative output]", and "X" can be fixed or can optionally be based on magnitude of the pinch to zoom gesture. In these and other manners a single intuitive user gesture (pinch to zoom-in) can be utilized to generate refined generative output without a user needing to provide an additional natural language query and/or without the user needing to separately provide multiple inputs in interacting with any GUI elements rendered with the initial generative output.

In some implementations, facilitating a modification of a generative output can include modifying portion(s) or an entirety of the generative output according to a request (e.g., an input gesture) from the user to generate a modified version of the generative output. A user can provide an input gesture in various ways, such as, but not limited to, using a touch interface of a computing device to facilitate performance of one or more touch gestures, using a camera to perform one or more visual gestures (e.g., one or more eye movements, raising eyebrows, shaking head, head movements, directing a gesture to computerized glasses and/or a wearable virtual reality device, etc.), and/or using any other input interface that can provide an input to a computing device.

In various implementations, when a user issues a natural language query, that query may be used to assemble an input prompt that is then processed using one or more trained machine learning models (e.g., LLM, VLM, image generation model, multi-modal model, transformer model, sequence-to-sequence model, encoder-decoder architecture, etc.) to generate a generative response (e.g., initial generative output data, modified output data, etc.). In various implementations, the generative response may include a sequence of tokens that includes raw or plain text. This raw or plain text may include both responsive content and "metadata instructions" for formatting and/or otherwise rendering the responsive content. Metadata instructions can include, for instance, markup language (e.g., markdown, Latex, XML, HTML, etc.) symbols that set forth how text should be rendered (e.g., font, spacing) and/or how some other additional portion of content should be presented. For instance, some LLMs can generate an LLM output that includes metadata instructions for rendering images, e.g., by identifying uniform resource locator(s) (URL) of those image(s).

The generated response can be operable to cause a client application (e.g., an application that gives access to an automated assistant or chatbot that engages in human-to-computer dialogs using the one or more trained machine learning models as a backend) to render the generated response as a rendered output (e.g., the initial generative output) in response to the input query. For instance, the rendered output may include raw textual content from the generated response that is rendered as set forth by metadata instructions that are also contained in the generated response, e.g., along with images and/or other content identified in the metadata instructions.

The rendered output can refer generally to what is presented to the user, which may be formatted to include text, audio, graphics, images, videos, and/or any other format for conveying information to a user. The user may select subportion(s) or entirety of rendered output(s), provide input gesture(s) to modify the selection(s) or entirety, and be presented modified rendered output(s) in which the selected subportion(s), or an entirety of rendered output(s), are altered based on user input gesture(s). A generated response can refer to the sequence of tokens that are generated using the one or more trained machine learning models. These tokens may include, for example, sequences of text, metadata instructions, etc., that are used to format and/or otherwise generate rendered output(s).

In various implementations, the user may be able to select a subportion (i.e. less than an entirety) of the rendered output and manipulate that selected subportion by issuing touch input(s) directed to a corresponding application and/or simultaneously providing another gesture (e.g., a facial expression, audible input, shaking gesture, shaking a device, etc.). For instance, if the rendered output contains three paragraphs, the user can and issue a variety of touch input gestures to manipulate only the selected subportion (e.g., a single paragraph, sentence, word, image, etc.), while leaving the remainder of the rendered output (any underlying raw generated response) unaltered. In an example of the user selecting a segment of textual prose (e.g., sentence(s) or paragraph(s)), the input gesture can be processed as a request that the selected text be made shorter, longer, more casual, more formal, simpler, more complex, and/or be provided with image(s), video(s), audio(s), and/or be provided using another device, and/or otherwise be modified in a way that corresponds to the input gesture.

Other examples of ways a selection can be altered in this manner include, but are not limited to, removing the selection, adding more detail (e.g., more text) or elaborating on details (e.g., more features in an image) contained in the selection, replacing word(s) with synonyms or other selected words or phrases, and so forth. In some implementations in which the selection states a position, theory, contention, or opinion, the user may request (e.g., using a pinch to zoom-in gesture) that additional information/text justifying and/or supporting the position, theory, contention, or opinion be added. In some implementations, the user may request (e.g., by drawing a question mark with their finger, or other drawing gesture) that citation(s) or reference(s) be added to support purported factual statements. In other implementations in which a user has selected content (e.g., double-tapping a rendered image) rendered exclusively using metadata instructions (e.g., an image), the metadata instructions themselves may be extracted and used as part of a subsequent model(s) prompt(s).

In some instances, a rendered output can contain extra formatting information that is added based on the aforementioned metadata instructions contained in the underlying raw generated response. For instance, HTML/XML code and/or document object model (DOM) nodes may be incorporated into (e.g., injected into, used to replace portions of) the generated response to make the generated response operable to be rendered by an HTML browser or other similarly configured user interface. When this occurs, in some cases, a mapping may be created that can be used later to identify portions of the raw generated response that correspond to subportion(s) of the subsequently rendered output that were selected by a user. In various implementations, when the user selects (e.g., drawing a box/rectangle on a touch interface with two fingers) the subportion of the rendered output, an indication of that subportion may be used with this mapping to extract a corresponding portion of the underlying response that was used to generate the rendered output. As one non-limiting example, when HTML code is incorporated into the generated response, HTML tags may be annotated with extra attributes (e.g., character offsets) that identify where in the originally generated response the content of that HTML DOM node originates.

The indication of the subportion of the rendered output that was selected by the user (e.g., starting and ending character positions selected simultaneously using two fingers) may be used to extract a portion of the original response. This extracted portion may then be assembled into a follow up application prompt. In some implementations, additional implied request(s) or command(s) may also be incorporated into the follow up application prompt. For instance, an additional implied request may be a request to "only modify the provided excerpt of the previous response in accordance with the user's touch input and leave the remainder of the previous response unaltered", and can be implied from a touch input gesture (e.g., tapping and/or holding three fingers onto a rendered output text paragraph that is between two other text paragraphs). In some implementations, the one or more trained machine models may be trained and/or fine-tuned using requests such as these, along with generated responses, and/or user input gestures. Follow up application prompt may then be processed using the same model(s) or a different model(s) to generate a subsequent generated response. The subportion of the subsequent generated response that corresponds to the portion of the previously rendered output that was selected by the user may be altered in accordance with the user's follow up request (e.g., a subsequent gesture and/or subsequent portion of an ongoing gesture). In some implementations, the remainder of the subsequently-generated output may be left untouched, and thus may not necessarily be processed using the model(s), thereby conserving considerable resources.

Even though a user may wish to only alter a selected subportion of rendered generative output, it may be the case that the changes requested by the user need to be propagated to parts of the rendered generative output outside of the selected subportion. Suppose the rendered generative output includes a proposed meeting agenda. Suppose further that a user swipes (e.g., a brief upward swipe) a first date in the agenda to request that the date be replaced with a second date that is different than the first date (e.g., a date that is later in time, relative to the first date). If the first date is contained elsewhere in the proposed agenda outside of the portion selected by the user, failing to replace those instance (s) with the second date may yield an inconsistent meeting agenda.

Accordingly, in some implementations, model(s) can be trained and/or fine-tuned to process commands to account for discrepancies between content and/or features contained inside and/or outside of a user's selection. For example, a tap-and-hold gesture on a date (e.g., " . . . Dec. 12, 2024 . . . ") in a selected portion of rendered output (generated from an underlying generated response) may trigger generation of an implied request to provide further detail (e.g., " . . . Thursday, Dec. 12, 2024 . . . ") about the date, or reformat the date, at the instance that was tapped and elsewhere in the rendered output, even in portion(s) not selected by the user. This feature may be particularly useful when model(s) is used to generate complex structured language such as source code, mathematical proofs, etc. For instance, a user may double-tap a particular portion of a code/text segment (e.g., a line or block) of model-generated source code to request that a variable name contained in the selection be altered to include additional information. The same variable name may then be altered throughout the model-generated source code, both in the user's selection and elsewhere. In some implementations, instances of the variable-to-be-altered that are found outside of the user's selection may be presented to the user one at a time, as a list or group, etc., facilitating toggling through and approving (or rejecting) each proposed replacement (e.g., using a facial expression gesture to a camera, using an audible input command, using another touch input gesture, and/or any other input command).

As noted previously, a generated response can include metadata instructions for rendering one or more images. Suppose a user selects a subportion of resulting rendered output that includes an image by providing a zoom-out touch gesture (e.g., pinching wide to narrow) to cause the image to be re-generated to have a broader range of content, to have less features, and/or to have one or more smaller features (e.g., smaller scale, lower resolution, smaller depicted objects, smaller range of colors, etc.). In some implementations, the user's selection of an image may be mapped to metadata instructions for retrieving the image contained in the underlying raw generated response. In some implementations, when metadata instructions for retrieving an image are detected as corresponding to the selected portion of the rendered output, an operation may be automatically triggered for finding and/or generated alternative images using a search query formulated based on the user's initial input query (e.g., "Find and explain the recent trend in fox migration.") and/or any other request implied by a user gesture, user context, and/or any other associated data, with prior permission from the user. For example, if the user selects an image of a graph by tapping and scribbling over the image, that may trigger formulation and/or submission of an image search query for images of different but related graphs. In some instances, the metadata instructions may be modified without necessarily requiring subsequent processing by model(s).

In some cases, the request may include a request to replace and/or supplement text with image(s) (e.g., in response to a touch input gesture that involves the user scribbling over the rendered text output). For instance, if the text says "Eiffel Tower", the user can perform a "scribble" gesture to cause an area near or adjacent to the text "Eiffel Tower" to include a picture of the Eiffel Tower. In some implementations, the touch input gesture can simultaneously modify text and request an image, and may employ a text-to-image generative model (that can include both a LLM to transform input text into a latent representation, as well as a generative image model) to generate a modified version of one or more of the rendered images, or completely new images. For example, a user can perform a series of gestures at a touch interface to indicate that the user would like certain rendered text to be modified (e.g., swiping a portion of text to "strike" the text), followed by the incorporation or modification of an image based on the modified text (e.g., drawing a picture frame with their finger(s) to indicate where the image should be rendered and/or the text that should serve as at least part of the subject matter for the image).

The above description is provided as an overview of some implementations of the present disclosure. Further description of those implementations, and other implementations, are described in more detail below.

Other implementations may include a transitory or non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates a system that includes an application and/or automated assistant that can provide modified generative output based on an input gesture directed to subportion(s), or entirety, of an initial generative output.

DETAILED DESCRIPTION

Figure 1A:
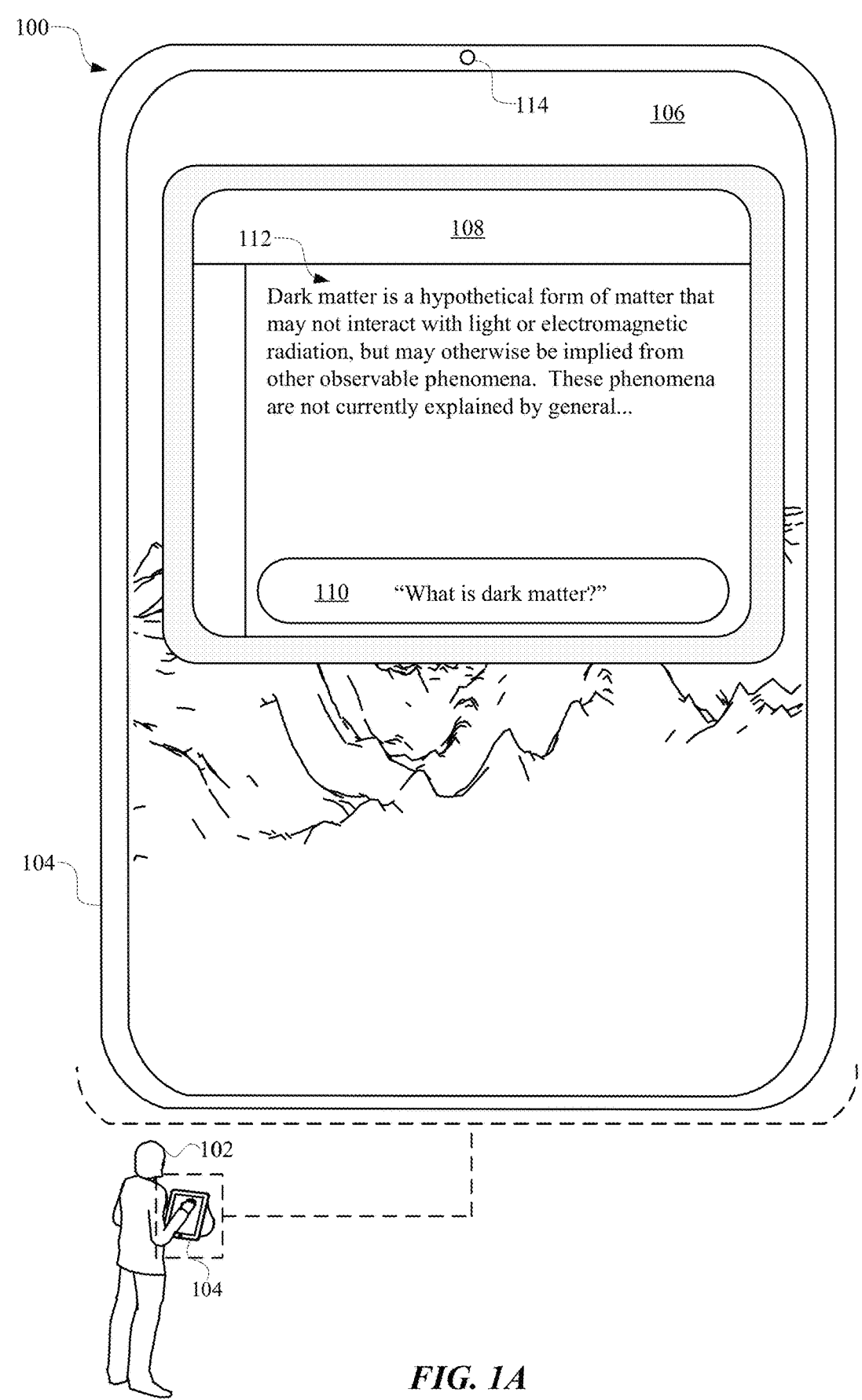
FIG. 1A, FIG. 1B, and FIG. 1C illustrate views a user interacting with an application that facilitates re-generation of subportions, or entirety, of a generative output according to user input gestures.
Figure 1B:
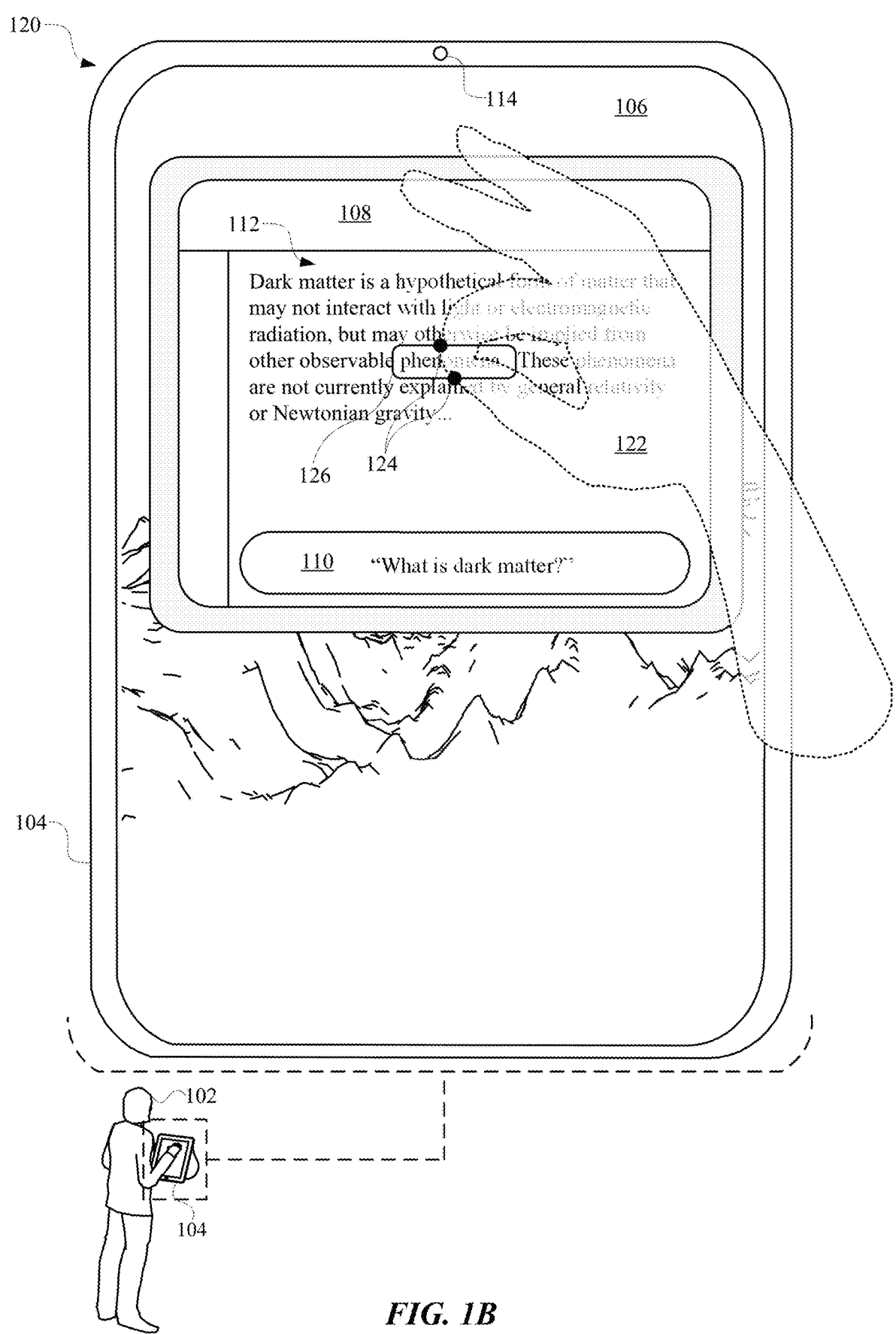
Figure 1C:
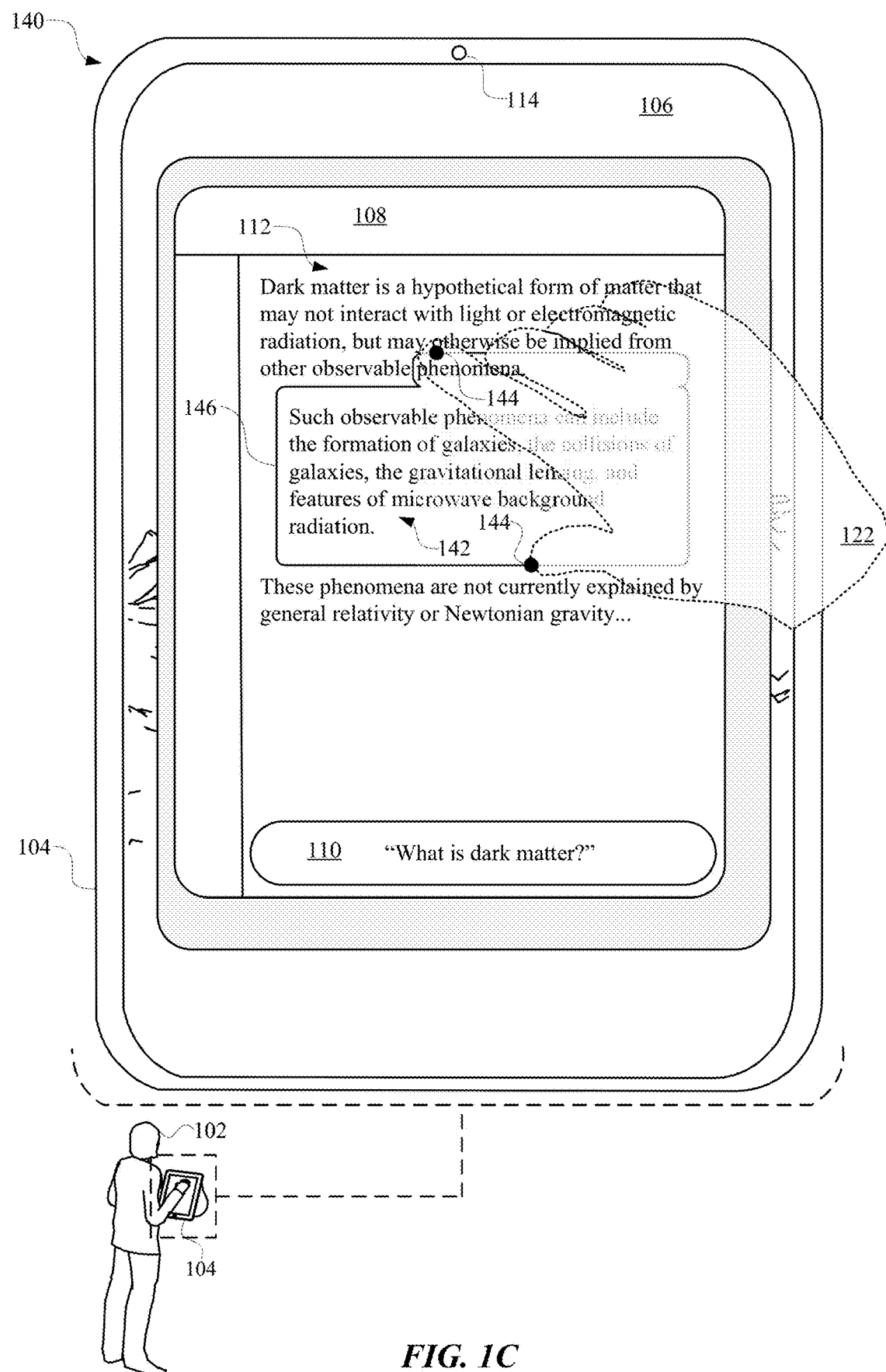

FIG. 1A, FIG. 1B and FIG. 1C illustrate a view 100, a view 120, and a view 140, respectively of a user 102 interacting with an application 108 that facilitates re-generation of subportions, or entirety, of a generative output according to user input gestures. In particular, FIG. 1A illustrates a view 100 of a user 102 interacting with an application 108 of a computing device 104 in furtherance of receiving a generative output 112. The generative output 112 can be rendered by the application 108 in response to an input query 110 such as, "What is dark matter?". In response to receiving this input query 110, the application 108 can generate the generative output by causing the input query 110 to be processed using one or more trained machine learning models (e.g., an LLM). When the application 108 receives generative output data as a result of the processing, the application 108 can cause the generative output 112 to be rendered at a display interface 106 of the computing device 104. The display interface 106 can be a touch-enabled display interface, thereby allowing the user 102 to provide input gestures using one or more appendages (i.e., extremities) of the user 102. In some implementations, an input gesture can be detected by processing one or more images, videos, and/or other data captured by a camera 214 or other sensor (e.g., when the computing device 104 is a wearable device that facilitates virtual or augmented reality).

When the generative output 112 is rendered at the display interface 106 by the application 108, the user 102 can provide an input gesture to the application 108 using their appendage 122 (e.g., hand(s), finger(s), etc.). For example, and as illustrated in view 120 of FIG. 1B, a first finger and a second finger of the user 102 can be pressed against the display interface 106 at a portion of the generative output 112 corresponding to one or more words, characters, image, and/or other portion 126 of the generative output. The first finger and the second finger can select a word such as "phenomena" by tapping two points 124 at the generative output 112, thereby indicating the start (e.g., a first portion) of an ongoing input gesture. Thereafter, the user 102 can adjust a location of their fingers on the display interface 106 in furtherance of performing a de-pinch gesture. The de-pinch gesture can involve the user 102 moving their appendages from the initial two points 124 to final two points 144. Features of this gesture, such as coordinates of the fingers of the user 102 during the gesture, a duration of the gesture or other temporal characteristic of the gesture, a velocity of the fingers during the gesture, an initial portion of text of the generative output, and/or any other features associated with the gesture can be processed.

For example, processing of data characterizing these features can be performed using one or more heuristic processes and/or one or more trained machine learning models to determine modified generative output 142 to render in response to the gesture. For example, the de-pinch gesture at the word "phenomena" of the generative output can indicate to the application 108 that the user 102 is requesting further details regarding the word "phenomena" in the context of the generative output. Alternatively, or additionally, the de-pinch gesture at the word "phenomena" can indicate to the application 108 that the user 102 would like to adjust a temperature of any model that is to re-process the portion 126 of the generative output, with any other relevant data, to generate the modified generative output 142. As a result, the application 108 can render the modified generative output 142 with, or without, any of the original text selected via the user input gesture.

Should the user 102 determine that the modified generative output 142 is still not adequate or otherwise accurately responsive to the input gesture, the user 102 can continue the gesture to modify a selected area 146. For example, the user 102 can pinch the two points 144 to further modify a model temperature to cause any further modified output to be simpler or less complex than the modified generative output 142, but more complex than the word "phenomena". In some implementations, one or more modified generative outputs can be buffered in memory of the computing device 104, and/or a remote device associated with the computing device 104, in furtherance of reducing latency that may be experienced by the user 102 when providing the gesture. Furthermore, by facilitating modifications to generative output without requiring a natural language text input to be subsequently provided and/or without an entirety of any prior natural language input queries being re-processed, users can perform one or more refinement operations while preserving device and application resources.

Figure 2A:
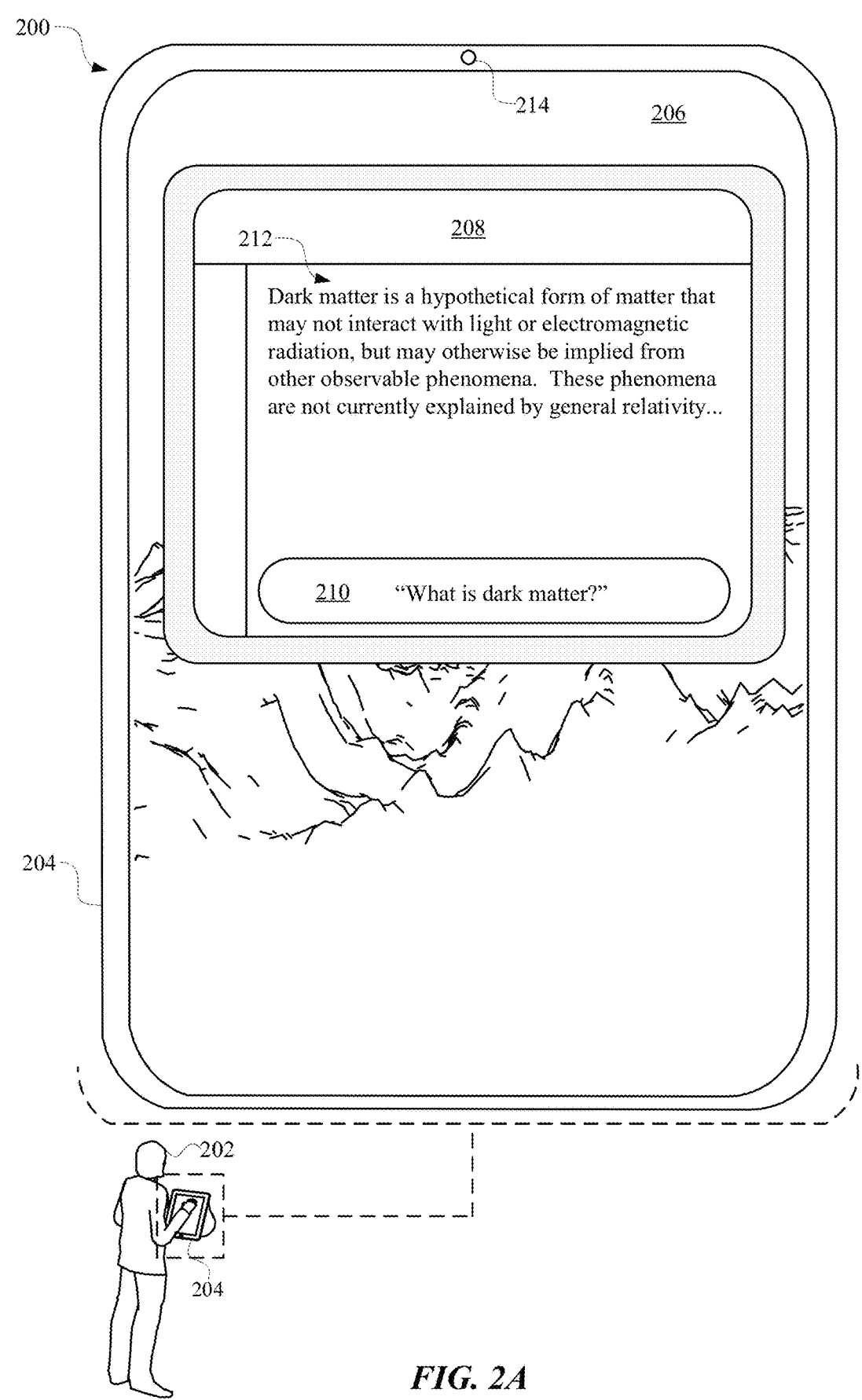
FIG. 2A, FIG. 2B and FIG. 2C illustrate views of a user interacting with an application that facilitates rendering of one or more images from generative content according to user input gestures directed to a subportion, or entirety, of an initial generative output.
Figure 2B:
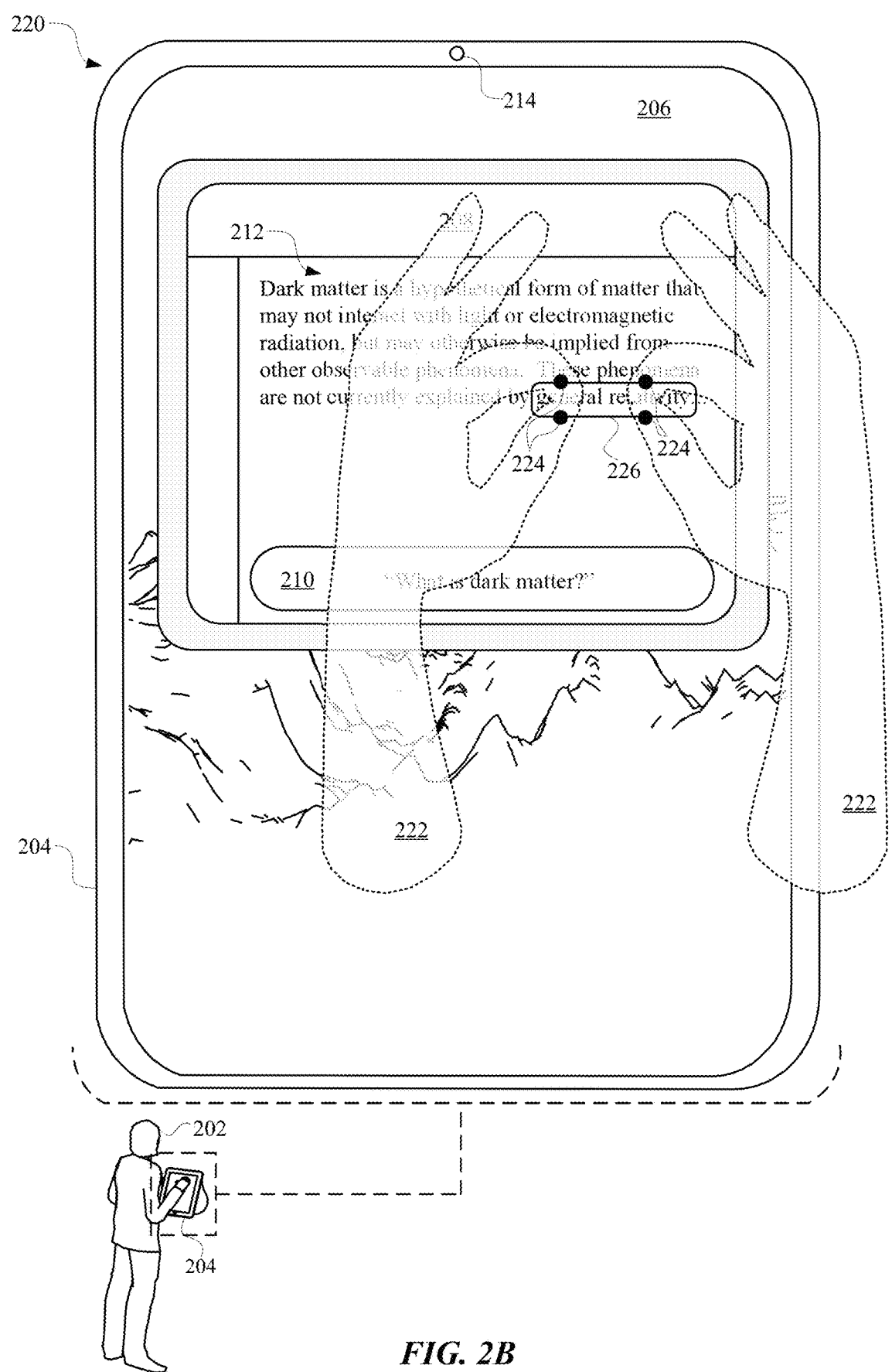
Figure 2C:
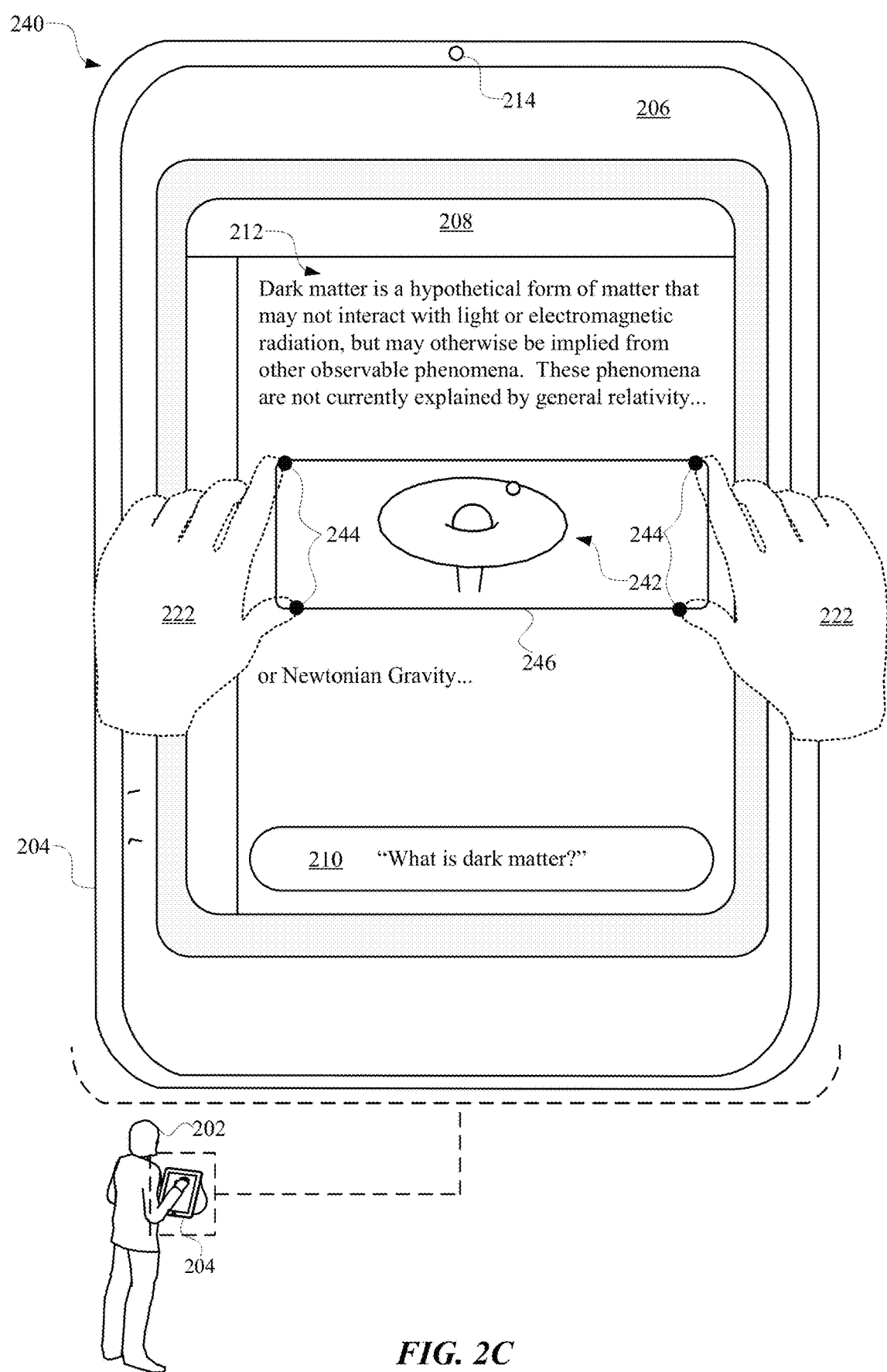

FIG. 2A, FIG. 2B and FIG. 2C illustrate a view 200, a view 220, and a view 240, respectively of a user 202 interacting with an application 208 that facilitates generation of one or more images from generative content according to user input gestures directed to a subportion, or entirety, of initial generative output. In particular, FIG. 2A illustrates a view 200 of a user 202 interacting with an application 208 of a computing device 204 in furtherance of receiving a generative output 212. The generative output 212 can be rendered by the application 208 in response to an input query 210 such as, "What is dark matter?". In response to receiving this input query 210, the application 208 can generate the generative output by causing the input query 210 to be processed using one or more trained machine learning models (e.g., an LLM). When the application 208 receives generative output data as a result of the processing, the application 208 can cause the generative output 212 to be rendered at a display interface 206 of the computing device 204. The display interface 206 can be a touch-enabled display interface, thereby allowing the user 202 to provide input gestures using one or more appendages of the user 202. In some implementations, an input gesture can be detected by processing one or more images, videos, and/or other data captured by a camera 214 or other sensor (e.g., when the computing device 204 is a wearable device that facilitates virtual or augmented reality).

When the generative output 212 is rendered at the display interface 206 by the application 208, the user 202 can provide an input gesture to the application 208 using their appendage 222 (e.g., hand(s), finger(s), etc.). For example, and as illustrated in view 220 of FIG. 2B, a first finger and a second finger of the user 202 can be pressed against the display interface 206 at a portion of the generative output 212 corresponding to one or more words, characters, image, and/or other portion 226 of the generative output. Fingers of the user 102 can select a phrase such as "general relativity" by pressing at four different points 224 at the generative output 212, thereby indicating the start of an ongoing input gesture. Thereafter, the user 202 can adjust a location of their fingers (e.g., via a second portion of the ongoing gesture) on the display interface 206 in furtherance of performing a window gesture (e.g., a request to place a picture at the selected portion of the generative output 212). The window gesture can involve the user 202 moving their appendages from the four different points 224, defining an area, to final two points 244, defining a larger area. Features of this gesture, such as coordinates of the fingers of the user 202 during the gesture, a duration of the gesture, a velocity of the fingers during the gesture, an initial portion of text of the generative output, and/or any other features associated with the gesture can be processed.

For example, processing of data characterizing these features can be performed using one or more heuristic processes and/or one or more trained machine learning models to determine modified generative output to render in response to the gesture. For example, the window gesture at the phrase "general relativity" of the generative output can indicate to the application 208 that the user 202 is requesting an image 242 be generated to represent the selected phrase "general relativity". Alternatively, or additionally, the window gesture at the phrase "general relativity" can indicate to the application 208 that the user 202 would like to adjust a temperature of any model that is to re-process the portion 226 of the generative output, with any other relevant data, to generate the image 242. For example, the selected temperature can be selected according to an area 246 of the window indicated by the gesture. As a result, the application 208 can render the image 242 with, or without, any of the original text selected via the user input gesture. Alternatively, or additionally, the application 208 can render the image 242 according to a size of the area 246, thereby causing any surrounding text of the generative output to be relocated to not interfere with the viewing of the image 242.

Should the user 202 determine that the inclusion of the image 242 is still not adequate or otherwise accurately responsive to the input gesture, the user 202 can continue the gesture to initialize one or more modification operations directed to content in the area 246. For example, the user 202 can expand or contract the four points 244 to further modify a model temperature to cause any further rendered image and/or modified image to be simpler or less complex than the image 242, but more complex than the phrase "general relativity". In some implementations, one or more modified generative outputs and/or generated images can be buffered in memory of the computing device 204, and/or a remote device associated with the computing device 204, in furtherance of reducing latency that may be experienced by the user 202 when providing the gesture.

FIG. 3 illustrates a system 300 that includes an application and/or automated assistant 304 that can provide modified generative output based on an input gesture directed to subportion(s), or entirety, of an initial generative output. In some implementations, all or aspects of the system 300 can be implemented locally at the computing device 302. In additional or alternative implementations, all or aspects of the system 300 can be implemented remotely from the computing device 302 (e.g., at remote server(s)). In those implementations, the computing device 302 and the system 300 can be communicatively coupled with each other via one or more networks, such as one or more wired or wireless local area networks ("LANs," including Wi-Fi LANs, mesh networks, Bluetooth, near-field communication, etc.) or wide area networks ("WANs", including the Internet).

The computing device 302 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The computing device 302 can execute one or more applications, such as application 334, via which queries can be submitted and/or natural language ("NL") based summaries and/or other response(s) to the query can be rendered (e.g., audibly and/or visually). The application 334 can be an application that is separate from an operating system of the computing device 302 (e.g., one installed "on top" of the operating system)—or can alternatively be implemented directly by the operating system of the computing device

302. For example, the application 334 can be a web browser installed on top of the operating system, or can be an application that is integrated as part of the operating system functionality. The application 334 can interact with the system 300.

In various implementations, the computing device 302 can include an input processing engine 306 that is configured to detect user input provided by a user of the computing device 302 using one or more user input interfaces. For example, the computing device 302 can be equipped with one or more microphones that capture audio data, such as audio data corresponding to spoken utterances of the user or other sounds in an environment of the computing device 302. Additionally, or alternatively, the computing device 302 can be equipped with one or more vision components that are configured to capture vision data corresponding to images and/or movements (e.g., gestures) detected in a field of view of one or more of the vision components. Additionally, or alternatively, the computing device 302 can be equipped with one or more touch sensitive components (e.g., a keyboard and mouse, a stylus, a touch screen, a touch panel, one or more hardware buttons, etc.) that are configured to capture signal(s) corresponding to touch input directed to the computing device 302. Some instances of a query or request described herein can be a query or request that is formulated based on user input provided by a user of the computing device 302 and detected via input processing engine 306. For example, the query or request can be a typed query or request that is typed via a physical or virtual keyboard, a suggested query or request that is selected via a touch screen or a mouse, a spoken voice query or request that is detected via microphone(s) of the client device, or an image query or request that is based on an image captured by a vision component of the client device.

In various implementations, the computing device 302 can include an output generating engine 314 that is configured to provide model-generated content for audible and/or visual presentation to a user of the computing device 302 using one or more user interfaces 320. For example, the computing device 302 can be equipped with one or more speakers that enable content to be provided for audible presentation to the user via the computing device 302. Additionally, or alternatively, the computing device 302 can be equipped with a display or projector that enables content to be provided for visual presentation to the user via the computing device 302. In some implementations, the display may be part of a head-mounted display (HMD).

In some implementations, output generating engine 314 may be configured to generate rendered content based on raw generative output. For example, an LLM response may include a sequence of tokens that is operable by output generating engine 314 to render audible and/or visual output. In some implementations, this sequence of tokens may include a sequence of raw text. Some parts of the sequence of raw text may include meaningful content that is responsive to a user's query or request. Other parts of the sequence of text may include metadata instructions (e.g., symbols) that are usable, e.g., by output generating engine 314, to cause the meaningful content to be rendered in a particular way (e.g., with selected fonts, line breaks, images, formatting, etc.). In some implementations, output generating engine 314 may also be configured to create a mapping between raw generative output and the downstream rendered content that is generated based on the raw generative output and/or input gesture. For instance, when incorporating raw LLM content into HTML DOM nodes, output generating engine 314 may add attributes (e.g., character offsets) to HTML tags that identify where in the underlying raw generative output the content that is going to be displayed using the DOM node is located.

In various implementations, the computing device 302 can include a gesture processing engine 318 that is configured to determine an input gesture provided by a user, and/or any other context (e.g., current or recent context) of the computing device 302 and/or of a user of the computing device 302. In a multi-turn dialog session between the user and an automated assistant (alternatively, "virtual assistant", "chatbot", etc.), the context of the client device and/or user may be maintained over multiple turns as a "user state" to determine how to accurately respond to an input gesture from the user.

In some implementations, the gesture processing engine 318 can determine one or more gestures provided by a user, along with any context, and/or user state, utilizing interface input data, data characterizing current or recent interaction(s) via the computing device 302, a location of the computing device 302, profile data of a profile of a user of the computing device 302 (e.g., an active user when multiple profiles are associated with the computing device 302), and/or other input data accessible to the gesture processing engine 318, and with prior permission from the user. For example, the gesture processing engine 318 can determine a current context based on a one or more recent queries of the search session, profile data, and/or a current location of the computing device 302.

As another example, the gesture processing engine 318 can determine a particular gesture, a type of gesture, and/or features of a gesture, based on which application is active in the foreground of the computing device 302, a current or recent state of the active application, and/or content currently or recently rendered by the active application. A context determined by the gesture processing engine 318 can be utilized, for example, in supplementing or rewriting a query or request that is formulated based on user input gesture, in generating an implied query or request (e.g., a query or request formulated independent of user input), and/or in determining to submit an implied query/request and/or to render result(s) for an implied query/request or gesture. The user's context across multiple turns of a search session can be used as a user state to enrich output rendered, e.g., by a search chatbot companion, at each turn of a multi-turn human-to-computer query input and gesture input session.

In various implementations, computing device 302 can include an output selection engine 316 that is configured to map a gesture selection of a subportion(s) of rendered generative output provided by output generating engine 314 to corresponding subportion(s) of raw generative output that were used to generate the rendered generative output. In some implementations, output generating engine 314 may utilize the HTML attributes (e.g., character offsets) mentioned previously to map a gesture selection of subportion(s) of rendered generative output provided by output generating engine 314 to corresponding subportion(s) of raw generative output.

In various implementations, output selection engine 316 may provide data indicative of this mapping, such as starting and ending characters indexes in the raw generative output, to other components to extract the corresponding portion of the raw generative output. In other cases, output selection engine 316 may use the mapping data directly to extract the corresponding portion of the raw generative output, and provide that extracted portion to a component of system 300, such as model input engine 322. Further, the computing device 302 and/or the system 300 can include one or more memories for storage of data and/or software applications, one or more processors for accessing data and executing the software applications, and/or other components that facilitate communication over one or more of the networks. In some implementations, one or more of the software applications can be installed locally at the computing device 302, whereas in other implementations one or more of the software applications can be hosted remotely (e.g., by one or more servers) and can be accessible by the computing device 302 over one or more of the networks.

Although aspects of FIG. 3 are illustrated or described with respect to a single client device having a single user, it should be understood that is for the sake of example and is not meant to be limiting. For example, one or more additional client devices of a user and/or of additional user(s) can also implement the techniques described herein. For instance, the computing device 302, the one or more additional client devices, and/or any other computing devices of a user can form a coordinated ecosystem of devices that can employ techniques described herein. These additional client devices and/or computing devices may be in communication with the computing device 302 (e.g., over a network(s)). As another example, a given client device can be utilized by multiple users in a shared setting (e.g., a group of users, a household).

In some implementations, a model selection engine 326 is provided to select zero, one or more generative models from multiple candidate models (e.g., LLMs, VLMs, multi-modal models, image generation model, one more image diffusion models, transformer-based model, sequent-to-sequence model, encoder-decoder architecture, and/or other models). For example, in some iterations the system will determine to not utilize any of the candidate generative models, in some iterations the system will determine to utilize only one of the candidate generative models, and in some iterations the system will determine to utilize multiple of the candidate generative models. Model selection engine 326 can optionally utilize one or more rules and/or one or more classifiers that are trained to generate output identifying which models are best suited to generate a response to a current query or request, given a current user state/context.

The model input engine 322 may be configured to assemble model input prompts based on data such as a current query, input gesture, generative output, modified generative output, current user state/context, past queries, past model responses (which may be included in the current user state/context), portions of past rendered generative outputs that are selected by users for modification, etc. Model input prompts may, in some implementations, include a sequence of tokens, which may be words, phrases, or embeddings generated from data such as text, images, audio, etc. For example, gesture input data can be processed using one or more generative models and/or any other suitable model to generate a gesture embedding from an input gesture. A correlation between the gesture embedding and one or more existing gesture embeddings (e.g., mapped in a latent space) can be determined. When the correlation satisfies one or more parameters for determining an adequate correlation (e.g., latent distance between embeddings satisfies threshold distance), one or more particular modification operations corresponding to the closest existing embedding can be selected to fulfill the input gesture. In some implementations, draft modified generative outputs can be preemptively generated for certain gesture embeddings in furtherance of reducing latency that may occur between a user providing an input gesture and the modified generative output being rendered.

In some implementations, a modified output engine 324 may be configured to apply one or more models stored in model data 332 to model input prompts generated by model input engine 322 to generate a model response. A model response may take various forms, such as a sequence of tokens that correspond to, represent, or directly convey words, phrases, embeddings, etc. models stored in model data 332 may take a variety of form, such as PaLM, BARD, BERT, LaMDA, Meena, GPT, and/or any other model, such as any other model that is encoder-only based, decoder-only based, sequence-to-sequence based and that optionally includes an attention mechanism or other memory. Visual language models (VLMs) capable of processing images and text may be included as well.

Output selection engine 316 may be configured to extract subportions of raw generative output that correspond with selected subportions of rendered generative output provided at computing device 302 by output generating engine 314 based on the raw generative output. As noted previously, in some implementations, output selection engine 316 may extract these portions of raw generative output based on mapping data received from output selection engine 316. For example, output selection engine 316 may provide starting and/or ending character positions, and output selection engine 316 may extract the subportion of the raw generative output that begins at the starting character position and ends at the ending character position.

Output selection engine 316 may be configured to further process the remainder of the raw generative output outside of the subportion(s) extracted by output selection engine 316 in order to maintain consistency between various aspects of the selected and unselected portions of the rendered generative output. Suppose a user selects a middle paragraph of an initial generative output. In response, the middle paragraph of the initial generative output can be extracted by output selection engine 316 and incorporated into a subsequent model input prompt by model input engine 322. This subsequent model input prompt may also include the user's request to enhance the content of the middle paragraph in accordance with any identified gesture, type of gesture, and/or gesture feature(s). When the subsequent input request is processed by modified output engine 324, the resulting model response may include the previous model response, except with a modified middle paragraph. Accordingly, in various implementations, output selection engine 316 may be configured to ensure that details changed within the selected portion of the initial generative output are also changed elsewhere, where applicable. In some implementations, output selection engine 316 may perform its actions heuristically, e.g., by extracting entities and facts from both the user selection and the remainder of the initial generative output and comparing them. In other implementations, training data 338 can be generated based on such interactions to maintain consistent factual details across both selected and unselected portions of any generative output and further facilitate training of models utilized when responding to input gestures.

Updating selected subportions of rendered generative output using models can sometimes generate unpredictable results. If a user asks for more details to be provided for a given selection (e.g., a paragraph) using an input gesture (e.g., a de-pinch gesture), the user may not want the resulting replacement of that selection to be significantly longer. Accordingly, in some implementations, modified output engine 324 may be configured to ensure that a user's request to modify a selected subportion of rendered generative output does not result in potentially negative consequences, too many changes, etc. For instance, in some implementations, modified output engine 324 may throw an error and/or cause a warning to be issued to the user if the user's request results in a threshold number of changes (e.g., altered characters or words), or changes that are too substantial (calculated, for instance, using edit distances, word counts, etc.).

In some implementations, output generating engine 314 may be configured to provide computing device 302 with raw generative output (e.g., sequences of tokens intermixed with metadata instructions), which may be operable by modified output engine 324 to provide rendered generative output. Additionally or alternatively, in some implementations, output generating engine 314 may generate content that can be rendered more directly, such as HTML code that includes the raw generative output and that can be rendered by output generating engine 314 or application 334, e.g., as a webpage.

In some implementations, when a user issues an input gesture to add content to a selected subportion of rendered generative output that requests to modify or replace one or more details contained therein, one or more components of system 300 may formulate a search query based on the one or more details of the selected subportion of the rendered generative output. Data from the one or more documents that are responsive to the search query may be incorporated, e.g., by model input engine 322, into a subsequent model input prompt that is used to generate a modified version of the previously rendered generative output. Some of the engines can be omitted or combined with each other in various implementations. A search engine can be employed to utilize indices and/or other resources in identifying search result documents that are responsive to queries or requests as described herein. A user request to modify a generative output can be formulated by component(s) of system 300 to identify search result documents or other content that can be used for modifying selected subportions of rendered generative output. For example, a user may request that evidence or other documentation be searched for and provided to support and/or refute details contained in a selected subportion of rendered generative output. The output generating engine 314 can then provide non-LLM generated search results that can be harvested for content to be presented along with an NL based summary described herein, and/or that may be used by modified output engine 324 to generate modified model responses.

Figure 4:
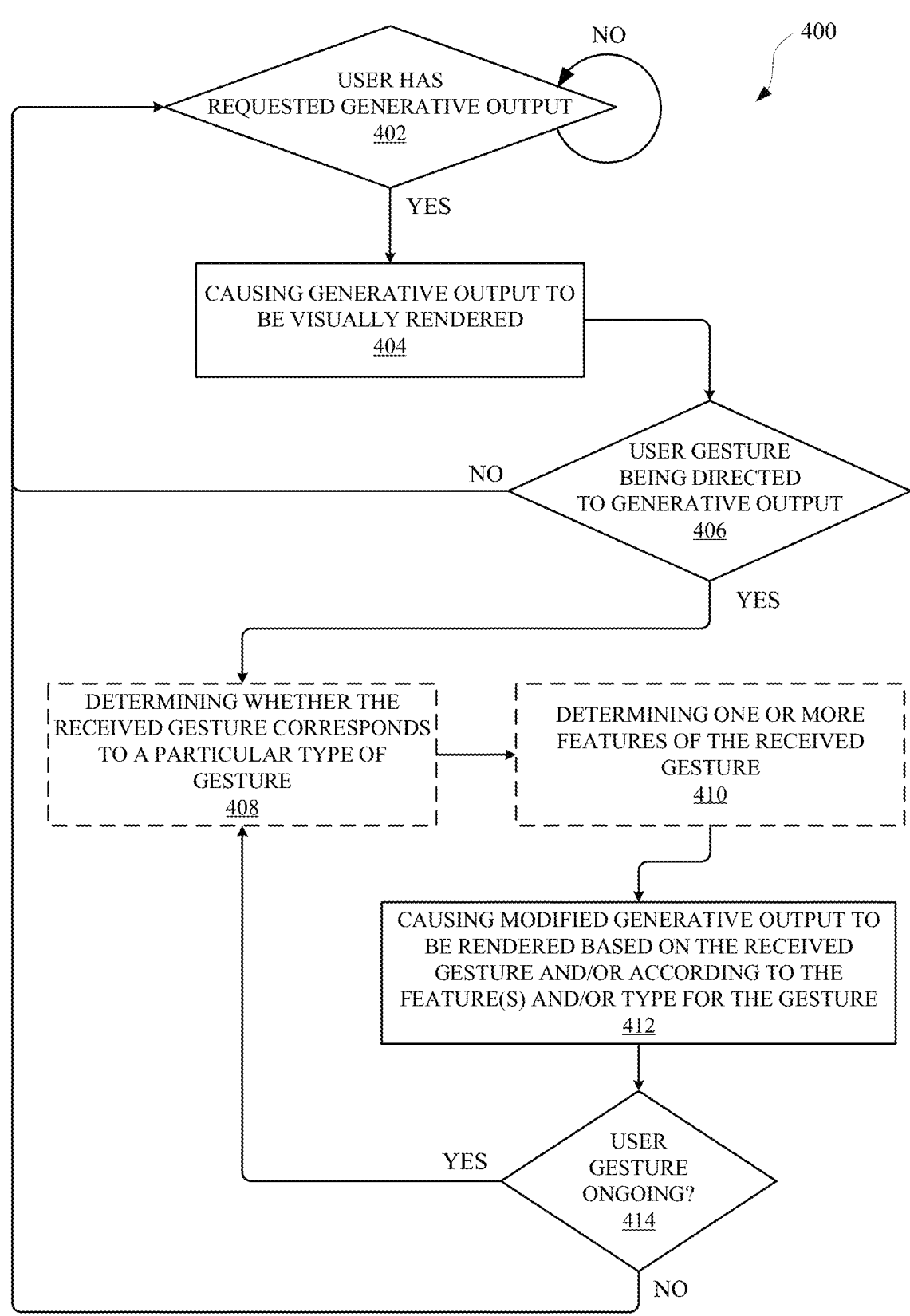
FIG. 4 illustrates a method for facilitating gesture modification of generative content without necessarily requiring additional natural language input and/or requiring interactive GUI elements to occupy a GUI and expressly advertise the availability of such functionality.

FIG. 4 illustrates a method 400 for facilitating gesture modification of generative content without necessarily requiring additional natural language input and/or requiring a GUI element to occupy a GUI and expressly advertise the availability of such functionality. The method 400 can be performed by one or more computing devices, applications, and/or any other apparatus or module that can be associated with an automated assistant. The method 400 can include an operation 402 of determining whether a user has requested generative output from an application and/or computing device providing access to an application or other software for facilitating output of a generative AI model. The process of determining whether a user has requested a generative output can be performed using various methods. For example, the application and/or device can analyze the captured input speech and match the recognized speech with a pre-existing model(s). In some implementations, the recognized speech can be matched with an existing speech model using techniques such as, but not limited to: Hidden Markov Models (HMMs) for detecting and recognizing phonemes, words, or sentences; Deep Neural Networks (DNNs) for modeling and matching the speech input with the corresponding language output; Gaussian Mixture Models (GMMs) for modeling the distribution of acoustic features of speech sounds based on statistical and/or probabilistic criteria; and/or using Convolutional Neural Networks (CNNs), in addition to modeling and matching speech sounds with Recurrent Neural Networks (RNNs).

When the user is determined to have requested a generative output, the method 400 can proceed from the operation 402 to an operation 404. The operation 404 may include causing a generative output to be generated and/or visually rendered at a display interface of a computing device. In some implementations, the operation 404 can include using Automatic Speech Recognition (ASR) to convert spoken language into written text using machine learning algorithms. For example, ASR can include preprocessing an audio input to a computing device, which captures the speech from the user. The preprocessing operation can remove noise, enhance the audio, and/or normalize the volume of the audio input data such that further extraction of audio features can be performed. In some implementations, one or more acoustic model (e.g., Hidden Markov Models (HMMs), Gaussian Mixture Models (GMMs), and Deep Neural Networks (DNNs)) can be used to map the audio features into the corresponding units of sound for a language, such as phonemes. When the phonemes have been mapped, a language model can be utilized to generate the most probable sequence of words given the phoneme sequence generated by the acoustic model. For example, candidate sequences can be generated using statistical models, such as n-grams, or neural network models, such as Recurrent Neural Networks (RNNs) and/or Transformers. In some implementations, generative output can be generated from audio input and/or textual input using an automatic speech recognition (ASR) engine, a natural language understanding (NLU) engine, a large language model (LLM) engine, and/or a text-to-speech (TTS) engine.

In some implementations, each of these engines may be configured to perform one or more functions. For example, an ASR engine can process, using streaming ASR model(s) stored in machine learning (ML) model(s) database (e.g., a recurrent neural network (RNN) model, a transformer model, and/or any other type of ML model capable of performing ASR), a stream of audio data that captures spoken utterances and that is generated by microphone(s) of the computing device to generate a stream of ASR output. Notably, the streaming ASR model can be utilized to generate the stream of ASR output as the stream of audio data is generated. Further, an NLU engine can process, using NLU model(s) stored in the ML model(s) database (e.g., a long short-term memory (LSTM), gated recurrent unit (GRU), and/or any other type of RNN or other ML model capable of performing NLU) and/or grammar-based rule(s), the stream of ASR output to generate a stream of NLU output.

Further, a model engine can process a set of outputs that are predicted to be responsive to the user input query in the stream of audio data processed by the ASR engine and/or in another textual input query from the user. In some implementations, the model engine can cause the set of outputs to be modified, using one or more generative model outputs, to generate a set of modified outputs. In some versions of those implementations, the application receiving the input query can cause one or more of the model outputs to be generated in an offline manner (e.g., not responsive to a spoken utterance or other natural language input being received during a dialog session), and subsequently utilized in an online manner (e.g., when speech or text is received during a dialog session) to generate the set of modified assistant outputs. In additional or alternative versions of those implementations, the application can cause one or more of the model outputs to be generated in an online manner (e.g., when speech or text is received during a dialog session).

In these implementations, the one or more model outputs can be generated based on processing, using one or more models stored in the model(s) database (e.g., one or more transformer models, such as Meena, RNNs, and/or any other model), the set of outputs (e.g., a stream of fulfillment data), a context of dialog session in which the speech, text, and/or input gesture is received (e.g., based on one or more contextual signals stored in contextual data 336), recognized text corresponding to the user input query, and/or other information (e.g., application data 330 from other applications 334) that the application can leverage in generating one or more of the model outputs. Each of the one or more model outputs can include, for example, a probability distribution over a sequence of one or more words and/or phrases across one or more vocabularies, and one or more of the words and/or phrases in the sequence can be selected as the one or more model outputs based on the probability distribution. In various implementations, one or more of the model outputs can be stored in model output(s) database for subsequent utilization in modifying one or more outputs included in the set of outputs (e.g., of an assistant application, generative AI application, and/or other application).

When a model output is selected according to the probability distribution and/or other process, the model output can be converted into a visual format for display at a display interface using available formatting and/or rendering techniques. In some implementations, and depending on a preference of the user, the text formatting process can involve a variety of operations, such as breaking the text into paragraphs, sentences, and/or individual words, in addition to properly adjusting punctuation using techniques such as sentence segmentation and/or text tokenization. When the generative output text has been formatted, a textual rendering engine can optionally indicate a layout of the text for the display interface, by specifying some display parameters such as the font size and/or the alignment of the text. In some implementations, the textual rendering engine can use techniques such as word wrapping, line breaking, and/or text justification to achieve a desired layout. In some implementations, the display rendering can be performed using one of the various graphics libraries such as OpenGL and Vulkan, and/or by applying web technologies such as HTML, CSS, and JavaScript.

When the generative output is visually rendered at the display interface, and/or otherwise accessible the user, the method 400 can proceed from the operation 404 to an operation 406. The operation 406 can include determining whether the user is directing an input gesture to the generative output, an application that provided the generative output, and/or an interface corresponding to the generative output. In various implementations, the client device can include a user input engine that detects user input provided by a user of the client device using one or more user interface input devices. For example, the client device can be equipped with one or more touch sensitive components (e.g., a keyboard and mouse, a stylus, a camera, a touch screen, a touch panel, one or more hardware buttons, etc.) that are configured to capture signal(s) corresponding to touch input (e.g., gestures) directed to the client device. Additionally, or alternatively, the client device may be equipped with one or more vision components that are configured to capture vision data corresponding to images and/or movements (e.g., gestures) detected in a field of view of one or more of the vision components. Alternatively or additionally, the client device can be equipped with one or more microphones that capture audio data, such as audio data corresponding to spoken utterances of the user or other sounds in an environment of the client device. When the user is determined to have provided a user gesture directed to the generative output that is rendered at the display interface, the method 400 can proceed from the operation 406 to an optional operation 408. Otherwise, the method 400 can return to the operation 402 or another suitable operation.

The optional operation 408 can include determining whether the received gesture corresponds to a particular type of gesture. In some implementations, a determination of the type of gesture can be based on determined certain gesture points identified in gesture data generated by a gesture input engine. The gesture points can be, for example, starting location(s) for one or more appendages of a user at or near an interface of a computing device. For example, a touch input can be at a touch display interface of a computing device, and a non-touch input can be near (i.e., within a detectable distance) of an interface (e.g., one or more cameras) of a computing device. The gesture data can characterize the path, change of direction, such as shape between gesture points, a three-dimensional shape, a two-dimensional shape, a point, one or more dimensions of a shape or abstraction, speed of the gesture, current duration of gesture, final duration of gesture, and/or any other suitable characteristic associated with a gesture. The gesture data can be processed using one or more heuristic processes and/or one or more trained machine learning models for determining a type of gesture that has been, or is being, received from the user. For example, the type of gesture can be selected from a set of predetermined gestures, and/or determined using one or more trained machine learning models that can facilitate type creations based on one or more requested operations that may be associated with the gesture data. For example, gesture data indicating that a user has "pinched" a portion of rendered generative output and then "slid" their pinching appendages (e.g., fingers or other extremities) across the touch interface can be characterized as a "slide-pinch" type of gesture. Operating instructions for fulfilling this type of gesture can be pre-determined, or compiled from existing data in response to receiving this gesture for the first time.

When the optional operation 408 is performed, the method 400 can optionally proceed to another optional operation 410 of determining one or more features of the received gesture. In some implementations, determining features of a gesture can be performed by a gesture engine, or other input processing engine, that can identify touch interactions at touch display interface or other touch-enabled device (e.g., touchpad, click wheel, etc.). Determining such features can include ascertaining whether a touch event has happened (e.g., detecting a finger-down event), determining intensity of the touch (e.g., the force or pressure exerted during the touch or other measure), detecting movement of the touch and/or determining a trajectory across a touch interface (e.g., identifying one or more instances of finger dragging), and/or detecting the cessation of the touch (e.g., recognizing a finger-up event or a break in contact). The determination of any gesture features can be represented by gesture data that can characterize speed (magnitude), velocity (magnitude and direction), and/or acceleration (changes in magnitude and/or direction) of the touch. Alternatively, or additionally, this data can characterize each particular touch (e.g., a finger, a single appendage, extremity, and/or stylus touch) or to multiple simultaneous touches (e.g., multiple fingers, multiple stylus, etc.).

Determining one or more features of an input gesture (e.g., different movements, timings, and/or intensities of detected touches) can be identified and correlated to one or more particular operations. For instance, recognizing a finger tap gesture can involve identifying a finger-down event followed by detecting a finger-up (lift-off) event at the same position (or nearly the same position) as the initial touch (e.g., at the position of a word in a generative output). Alternatively, or additionally, gestures like tap, swipe, drag, and/or others may be identified for one or more appendages (e.g., fingers) by detecting corresponding touch patterns from any generated gesture data.

In some implementations, one or more processing parameters for an operation (i.e. an intent) executed in response to a finger tap gesture at a portion of generative output can be based on the duration between detecting the finger-down event and the finger-up event, and/or the intensity of the finger touch during that duration. For example, a parameter such as a model temperature parameter can be selected according to the duration between the finger-down and finger-up events, and/or their relationship to any predefined threshold (e.g., less than or greater than X time in seconds). Alternatively, or additionally, a parameter can be selected according to whether the touch intensity during the tap meets a specified intensity threshold (e.g., greater than a nominal touch detection intensity threshold), such as a light press or deep press intensity threshold. In some implementations, when an appendage is hovered over, and/or motioning to, a touch interface and/or in front of a camera (e.g., one or more cameras of a VR headset), the selected parameter may or may not depend on any direct physical contact between an appendage and a touch interface.

In some implementations, these principles can apply to other types of gestures, such as a swipe gesture, a pinch gesture, a de-pinch (i.e., reverse pinch) gesture, scribble gesture, zig-zag gesture, and/or a long press gesture. In other words, parameters selected for any operations determined to be requested in response to such gestures can be identified based on touch intensity, duration of time, rate or velocity of gesture and/or of movement, touch location(s), degree of shaking, starting location(s), ending location(s), and/or any other feature of a gesture. For example, a swipe gesture may be identified based on a two-dimensional path of a touch movement; a pinch gesture may be identified based on movement of two or more touches towards each other; a de-pinch gesture may be identified based on movement of two or more touches away from each other; and a long press gesture may be identified based on the duration of the touch on the touch interface with less than a threshold amount of movement. A touch can refer to an appendage of a user directly contacting a touch interface of a computing device, an appendage of a user indicating touch point(s) within a volume of space within a detectable distance of a sensor (e.g., a camera, other vision sensor, audio sensor, doppler sensor, haptic sensor, etc.), and/or any other user input that can indicate a touch.

When one or more features of a received input gesture are determined, the method 400 can proceed from the operation 410 to an operation 412. The operation 412 can include causing modified generative output to be rendered based on the received gesture and/or according to the feature(s) and/or the type for the gesture. For example, one or more processing parameters selected based on a duration of the swipe gesture can include a size of, and/or an amount of detail for, an image to be appended to the generative output that the swipe gesture is being directed to. Alternatively, or additionally, another parameter selected based on a touch intensity of a tap gesture can be a model temperature for generating a replacement portion of for a portion of a generative output selected via the tap gesture. Alternatively, or additionally, another parameter selected based on a touch location(s) and intensities for a tap gesture, or a swipe gesture, can be an amount of text to replace at a generative output. Alternatively, or additionally, yet another parameter can be selected in response to a gesture based on an area of a boundary drawn by the gesture, and/or a direction (e.g., clockwise, counterclockwise, etc.) of drawing of the gesture. The selected parameter can correlate to a size and/or complexity for an image to be included in any modified generative output, and/or can correlate to an amount of text and/or a level of comprehension estimated for understanding any text to be included in the modified generative output.

The modified generative output can be generated in response to executing any operation(s) and/or corresponding parameter selected for an input gesture received at a portion of a generative output. For example, an operation of generating an image from a portion of the generative output can be performed in response to a user providing a zig-zag gesture over a subportion of text rendered using a model. The zig-zag can be relatively intense and thus result in a parameter being selected and an image generation prompt causing the image to be particularly detailed, at least compared to any image generated in response to zig-zag gesture of relatively low intensity (e.g., a light touch across a touch display interface). In some implementations, the portion of generative output selected via the input gesture can be processed using a trained model, and according to one or more parameters that are set according to one or more features of the input gesture. For example, a pinch or de-pinch gesture received at a subportion of text of a generative output can result in a less complex, or more complex, respectively, modified generative output replacing any portion of the initial generative output that the input gesture was directed to.

When the modified generative output is rendered according to the type of gesture and/or any one or more determined features of the gesture, the method 400 can proceed from the operation 412 to an operation 414. The operation 414 can include determining whether the user input gesture is ongoing. For example, if the input gesture was a tap gesture that is determined to have been completed and/or the user has otherwise indicated approval of any modified generative output, the method 400 can proceed form the operation 414 and return to the operation 402, or another suitable operation. Otherwise, when the input gesture is determined to be ongoing, the method 400 can return to the optional operation 408. As a result, any modified generative output rendered at the operation 412 can be further modified according to any features of the ongoing input gesture. For example, content rendered in response to a first portion of a zig-zag gesture can include a chart or other image that explains generative output text that received the first portion of the zig-zag gesture. However, as additional and/or modified features of the zig-zag gesture are determined (e.g., a change in intensity, direction, speed of swipe, etc.), the content rendered can be further adjusted according to such features. For example, when a user initially starts the zig-zag gesture at a relatively high velocity for a first swipe, the rendered content can include a relatively simple chart explaining a subportion of generative output. However, the user can view this simple chart and determine to slow the velocity of a second swipe of the zig-zag gesture, thereby causing the simple chart to be replaced with a more complex chart (e.g., going from one single trendline to three trendlines).

In some implementations, the content for any modified generative output can be generated preemptively before receiving, and/or during receipt of, a gesture that is directed to modifying some generative output. This content can be generated according to any predicted gesture that an application and/or device anticipates will be received from a user based on historical data, contextual data, and/or any other data useful for anticipating a particular user gesture. In this way, server requests during an interaction with an LLM or other generative model can be preserved, thereby mitigating latency during such interactions. By reducing latency, other application and/or device tasks can be performed using any freed-up bandwidth and/or other resources that otherwise would not have been available. In some implementations, features of ongoing gestures can be processed as training data and/or feedback for any modified generative output that is generated initially when an input gesture is first received. Thereafter, training of any generative model can be enhanced through further training (e.g., supervised learning) of any affected models, thereby leading to further reducing durations of user interactions. In this way, resources such as power and network bandwidth can be preserved across populations of devices that might not otherwise adapt any user-specific models in this way.

Figure 5:
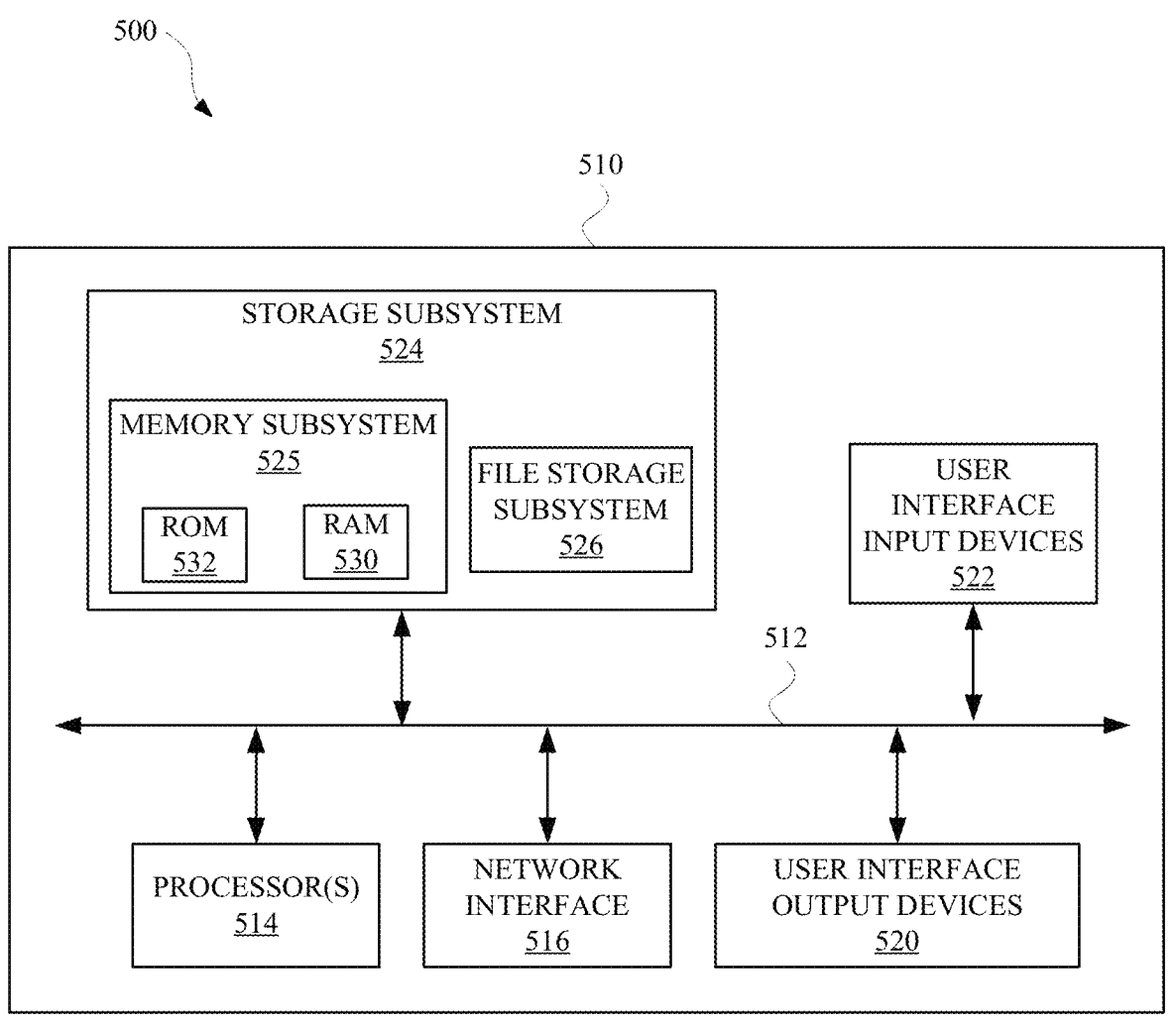
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system

300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Duc to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes causing an initial generative output to be visually rendered at a display interface of a client computing device in response to user interface input. The initial generative output is generated using one or more generative models to process the user interface input received at the client computing device. The method further includes determining, while the initial generative output is visually rendered at the display interface, that an input interface of the client computing device, or a separate computing device, has received an input gesture. A user performs the input gesture by motioning, at or near a particular portion of the display interface that includes the visually rendered initial generative output, without directly interacting with a separate graphical user interface (GUI) element for modifying the initial generative output. The method further includes generating, based on the input gesture and using the one or more generative models or a separate generative model, modified generative output. The modified generative output includes a modification of, or refinement to, the initial generative output, and the modification is determined according to the input gesture. The method further includes causing the modified generative output to be visually rendered at the display interface of the client computing device in lieu of, or in addition to, the initial generative output being rendered at the display interface.

These and other implementations of the technology disclosed herein can include one or more of the following features.

In some implementations, generating, based on the input gesture, the modified generative output includes: determining that the input gesture corresponds to a request for one or more images to be generated based on at least a portion of the initial generative output; generating an image generation prompt that is based on the at least the portion of the initial generative output; and in response to determining that the input gesture corresponds to the request for the one or more images to be generated based on the at least the portion of the initial output: processing the image generation prompt using one or more image diffusion models to generate the one or more images, and including the one or more images as part of the modified generative output.

In some implementations, generating the modified generative output based on the input gesture includes: determining one or more processing parameters based on one or more features of the input gesture, and determining that a portion of the initial generative output, and/or the user interface input, is to be processed using the one or more generative models, or the separate generative model, according to the one or more processing parameters. In some versions of those implementations, the one or more processing parameters include a temperature of the one or more generative models, or the separate model, to utilize in generating the modified generative output. In some additional or alternative versions of those implementations, determining the one or more processing parameters based on the one or more features of the input gesture includes determining a starting location and an ending location for the input gesture at the input interface of the client computing device and determining the one or more processing parameters based on the starting location and the ending location for the input gesture. The starting location and the ending location are indicated by the motioning over the particular portion of the display interface. In some of those versions, the motioning includes one or more eye movements, finger movements, facial expressions, hand movements, and/or head movements.

In some implementations, generating the modified generative output based on the input gesture includes determining a type of input gesture performed by the user and determining one or more processing parameters based on the type of input gesture. In some versions of those implementations, the type of input gesture includes a pinch gesture that is performed when at least two extremities of the user become more proximate during performance of the input gesture or become less proximate during the performance of the input gesture. In some of those versions, the one or more processing parameters are determined based on a magnitude of a change in proximity of the at least two extremities of the user during the pinch gesture. For example, the type of input gesture can include a shaking gesture that is performed when the user causes the client computing device, or the separate computing device, to shake and, optionally, the one or more processing parameters are determined based on a degree of shaking that is effectuated via the shaking gesture. As another example, the type of input gesture can include a drawing gesture that is performed when an extremity of the user draws a two-dimensional or a three-dimensional shape for a duration of time at the client computing device, or the separate computing device and, optionally, the one or more processing parameters are determined based on one or more dimensions of the two-dimensional or the three-dimensional shape, and/or a rate at which the one or more dimensions are drawn by the user during the duration of time.

In some implementations, generating the modified generative output based on the input gesture includes determining one or more refinement operations to which the input gesture corresponds. The modified generative output is further based on the one or more refinement operations and at least one or more portions of the user input, and/or the initial generative output. In some of those implementations, determining the one or more refinement operations includes: processing gesture input data using the one or more generative models, and/or the separate generative model, to generate a gesture embedding from the input gesture, and determining a correlation between the gesture embedding and one or more existing gesture embeddings that correspond to one or more particular modification operations. The one or more modification operations are selected from the one or more particular modification operations.

In some implementations, the method further includes, prior to receiving the input gesture, generating a draft modified generative output based on the user interface input.

In some implementations, a method implemented by processor(s) is provided and includes receiving a first portion of an input gesture at an input interface of a client computing device. A user performs the input gesture by motioning at or near a particular portion of graphical user interface (GUI) of the client computing device without interacting with a GUI element that is separate from a generative model output embodied in the particular portion of the GUI. The method further includes causing gesture data to be processed by one or more generative models to determine modified output data for rendering at a GUI of the client computing device. The modified output data indicates a modification to the particular portion of the GUI according to the first portion of the input gesture and the gesture data characterizes the input gesture. The method further includes causing the modification to the particular portion of the GUI to be rendered at a display interface of the client computing device. The modification to the particular portion of the GUI is rendered while the input gesture continues to be provided by the user. The method further includes receiving a second portion of the input gesture at the input interface of the client computing device. The second portion of the input gesture is performed by motioning at or near an additional portion of the GUI that includes the modification to the particular portion of the GUI. The method further includes determining that the second portion of the input gesture indicates approval of, or a request to modify, the additional portion of the GUI. The method further includes causing the client computing device, or another computing device, to render feedback for the user according to whether the second portion of the input gesture indicates approval of, or the request to modify, the additional portion of the GUI.

These and other implementations of the technology disclosed herein can include one or more of the following features.

In some implementations, the first portion of the input gesture includes the user motioning one or more appendages across a touch display interface that is rendering the GUI of the client computing device and/or the second portion of the input gesture includes the user maintaining the one or more appendages at locations on the touch display interface for a threshold duration of time to indicate approval of the modification of the particular portion of the GUI.

In some implementations, the first portion of the input gesture includes the user motioning one or more appendages across a touch display interface that is rendering the GUI of the client computing device and/or the second portion of the input gesture includes the user further motioning the one or more appendages across the touch display interface to indicate the request to modify the additional portion of the GUI.

In some implementations, the first portion of the input gesture includes the user motioning one or more appendages across a touch display interface that is rendering the GUI of the client computing device and/or the second portion of the input gesture includes the user exhibiting a facial expression that is detected by another input interface of the client computing device and indicates approval of, or the request to modify, the additional portion of the GUI.

In some implementations, a method implemented by processor(s) is provided and includes processing a natural language input received from a user of a client application. The client application employs one or more generative models to provide a generative output based on the natural language input. The method further includes providing, based on the natural language input, the generative output to the client application in furtherance of the client application rendering an image file at a display interface of a client computing device. The method further includes determining, subsequent to the natural language input being received at the client application, that an input interface of the client computing device, or another computing device, has received an input gesture. The user performs the input gesture by motioning over a particular portion of the display interface that is providing a rendering of the image file. The method further includes generating additional generative output based on the input gesture, where the additional generative output indicates a modification to be made to the rendering of the image file. The method further includes providing the additional generative output to the client application in furtherance of the client application rendering a modified image at the display interface. The client application receives the additional generative output and causes at least a portion of the rendering of the image file to be replaced or modified by the modified image.

These and other implementations of the technology disclosed herein can include one or more of the following features.

In some implementations, generating the additional generative output based on the input gesture includes: determining that the input gesture corresponds to a request for modified image to be generated based on at least a portion of the rendering of the image file being selected by the user via the input gesture; and processing rendered output data using one or more images diffusion models to generate the modified image. The rendered output data characterizes at least the portion of the rendering of the image file and the client application renders the modified image based on the rendered output data.

In some implementations, generating additional generative output based on the input gesture includes determining one or more processing parameters based on one or more features of the input gesture and determining that the additional image file is to be generated using the one or more generative models in accordance with the one or more processing parameters. In some of those implementations, the one or more generative models include an image diffusion model and the one or more processing parameters include a temperature parameter.

In some implementations, determining the one or more processing parameters based on the one or more features of the input gesture includes determining a temporal characteristic of the input gesture during the motioning over the particular portion of the display interface. In some of those implementations, the motioning includes one or more eye movements, finger movements, hand movements, and/or head movements.

In some implementations, generating the additional generative output based on the input gesture includes determining one or more modification operations that the input gesture corresponds. The additional generative output is further based on the one or more modification operations and at least one or more portions of the natural language input, and/or the image file.

We claim:

1. A method implemented by one or more processors, the method comprising:

causing an initial generative output to be visually rendered at a display interface of a client computing device in response to user interface input,
    wherein the initial generative output is generated using one or more generative models to process the user interface input received at the client computing device;

determining, while the initial generative output is visually rendered at the display interface, that an input interface of the client computing device, or a separate computing device, has received an input gesture,
    wherein a user performs the input gesture by motioning, at or near a particular portion of the display interface that includes the visually rendered initial generative output, without directly interacting with a separate graphical user interface (GUI) element for modifying the initial generative output;

generating, based on the input gesture and using the one or more generative models or a separate generative model, modified generative output,
    wherein the modified generative output includes a modification of, or refinement to, the initial generative output, and
    wherein the modification is determined according to the input gesture;

causing the modified generative output to be visually rendered at the display interface of the client computing device in lieu of, or in addition to, the initial generative output being rendered at the display interface.

2. The method of claim 1, wherein generating, based on the input gesture, the modified generative output includes:

determining that the input gesture corresponds to a request for one or more images to be generated based on at least a portion of the initial generative output;

generating an image generation prompt that is based on the at least the portion of the initial generative output; and in response to determining that the input gesture corresponds to the request for the one or more images to be generated based on the at least the portion of the initial generative output:
    processing the image generation prompt using one or more image diffusion models to generate the one or more images, and
    including the one or more images as part of the modified generative output.

3. The method of claim 1, wherein generating the modified generative output based on the input gesture includes:

determining one or more processing parameters based on one or more features of the input gesture, and determining that a portion of the initial generative output, and/or the user interface input, is to be processed using the one or more generative models, or the separate generative model, according to the one or more processing parameters.

4. The method of claim 3, wherein the one or more processing parameters include a temperature of the one or more generative models, or the separate generative model, to utilize in generating the modified generative output.

5. The method of claim 3, wherein determining the one or more processing parameters based on the one or more features of the input gesture includes:

determining a starting location and an ending location for the input gesture at the input interface of the client computing device,
    wherein the starting location and the ending location are indicated by the motioning over the particular portion of the display interface, and determining the one or more processing parameters based on the starting location and the ending location for the input gesture.

6. The method of claim 5, wherein the motioning includes one or more eye movements, finger movements, facial expressions, hand movements, and/or head movements.

7. The method of claim 1, wherein generating the modified generative output based on the input gesture includes:

determining a type of input gesture performed by the user, and determining one or more processing parameters based on the type of input gesture.

8. The method of claim 7, wherein the type of input gesture includes a pinch gesture that is performed when at least two extremities of the user become more proximate during performance of the input gesture or become less proximate during the performance of the input gesture.

9. The method of claim 8, wherein the one or more processing parameters are determined based on a magnitude of a change in proximity of the at least two extremities of the user during the pinch gesture.

10. The method of claim 7, wherein the type of input gesture includes a shaking gesture that is performed when the user causes the client computing device, or the separate computing device, to shake.

11. The method of claim 10, wherein the one or more processing parameters are determined based on a degree of shaking that is effectuated via the shaking gesture.

12. The method of claim 7, wherein the type of input gesture includes a drawing gesture that is performed when an extremity of the user draws a two-dimensional or a three-dimensional shape for a duration of time at the client computing device, or the separate computing device.

13. The method of claim 12, wherein the one or more processing parameters are determined based on one or more dimensions of the two-dimensional or the three-dimensional shape, and/or a rate at which the one or more dimensions are drawn by the user during the duration of time.

14. The method of claim 1, wherein generating the modified generative output based on the input gesture includes:

determining one or more refinement operations to which the input gesture corresponds, wherein the modified generative output is further based on the one or more refinement operations and at least one or more portions of the user input, and/or the initial generative output.

15. The method of claim 14, wherein determining the one or more refinement operations includes:

processing gesture input data using the one or more generative models, and/or the separate generative model, to generate a gesture embedding from the input gesture, and determining a correlation between the gesture embedding and one or more existing gesture embeddings that correspond to one or more particular modification operations, wherein the one or more modification operations are selected from the one or more particular modification operations.

16. The method of claim 1, further comprising:

prior to receiving the input gesture:

generating a draft modified generative output based on the user interface input.

17. A method implemented by one or more processors, the method comprising:

receiving a first portion of an input gesture at an input interface of a client computing device, wherein a user performs the input gesture by motioning at or near a particular portion of a graphical user interface (GUI) of the client computing device without interacting with a GUI element that is separate from a generative model output embodied in the particular portion of the GUI;

causing gesture data to be processed by one or more generative models to determine modified output data for rendering at the GUI of the client computing device, wherein the modified output data indicates a modification to the particular portion of the GUI according to the first portion of the input gesture and the gesture data characterizes the input gesture;

causing the modification to the particular portion of the GUI to be rendered at a display interface of the client computing device, wherein the modification to the particular portion of the GUI is rendered while the input gesture continues to be provided by the user;

receiving a second portion of the input gesture at the input interface of the client computing device, wherein the second portion of the input gesture is performed by motioning at or near an additional portion of the GUI that includes the modification to the particular portion of the GUI;

determining that the second portion of the input gesture indicates approval of, or a request to modify, the additional portion of the GUI; and causing the client computing device, or another computing device, to render feedback for the user according to whether the second portion of the input gesture indicates approval of, or the request to modify, the additional portion of the GUI.

18. The method of claim 17, wherein the first portion of the input gesture includes the user motioning one or more appendages across a touch display interface that is rendering the GUI of the client computing device, and wherein the second portion of the input gesture includes the user maintaining the one or more appendages at locations on the touch display interface for a threshold duration of time to indicate approval of the modification of the particular portion of the GUI.

19. The method of claim 17, wherein the first portion of the input gesture includes the user motioning one or more appendages across a touch display interface that is rendering the GUI of the client computing device, and wherein the second portion of the input gesture includes the user further motioning the one or more appendages across the touch display interface to indicate the request to modify the additional portion of the GUI.

20. The method of claim 17, wherein the first portion of the input gesture includes the user motioning one or more appendages across a touch display interface that is rendering the GUI of the client computing device, and wherein the second portion of the input gesture includes the user exhibiting a facial expression that is detected by another input interface of the client computing device and indicates approval of, or the request to modify, the additional portion of the GUI.

21. A system, comprising:

memory storing instructions; and one or more processors operable to execute the instructions to:

cause an initial generative output to be visually rendered at a display interface of a client computing device in response to user interface input, wherein the initial generative output is generated using one or more generative models to process the user interface input received at the client computing device;

determine, while the initial generative output is visually rendered at the display interface, that an input interface of the client computing device, or a separate computing device, has received an input gesture, wherein a user performs the input gesture by motioning, at or near a particular portion of the display interface that includes the visually rendered initial generative output, without directly interacting with a separate graphical user interface (GUI) element for modifying the initial generative output;

generate, based on the input gesture and using the one or more generative models or a separate generative model, modified generative output, wherein the modified generative output includes a modification of, or refinement to, the initial generative output, and wherein the modification is determined according to the input gesture;

cause the modified generative output to be visually rendered at the display interface of the client computing device in lieu of, or in addition to, the initial generative output being rendered at the display interface.

* * * * *